United States Patent [19]

Ziegler

[11] 4,249,396
[45] Feb. 10, 1981

[54] FLEXIBLE COUPLING

[75] Inventor: Günther Ziegler, Waldkraiburg, Fed. Rep. of Germany

[73] Assignee: SGF - Süddeutsche Gelenkscheibenfabrik GmbH & Co. KG, Fed. Rep. of Germany

[21] Appl. No.: 951,277

[22] Filed: Oct. 13, 1978

[30] Foreign Application Priority Data

Oct. 13, 1977 [DE] Fed. Rep. of Germany ....... 2746127

[51] Int. Cl.³ .............................................. F16D 3/14
[52] U.S. Cl. .................................. 64/27 NM; 64/14; 192/106.1
[58] Field of Search ............. 64/27 NM, 14, 13, 11 R, 64/27 C; 192/106.1, 70.17, 55, 106.2

[56] References Cited

U.S. PATENT DOCUMENTS

| 1,284,269 | 11/1918 | Eaton | 64/27 C |
|---|---|---|---|
| 2,533,789 | 12/1950 | Goodchild | 64/27 NM |
| 2,574,573 | 11/1951 | Libby | 64/27 C |
| 3,385,082 | 5/1968 | Deuring et al. | 64/27 NM |
| 3,386,265 | 6/1968 | Kasaback | 64/27 NM |
| 3,438,222 | 4/1969 | Paulsen | 64/27 NM |
| 4,139,995 | 2/1979 | Lamarche | 64/27 C |

FOREIGN PATENT DOCUMENTS 1211689  11/1970  United Kingdom ................ 64/27 NM Primary Examiner—Charles J. Myhre
Assistant Examiner—Magdalen Moy
Attorney, Agent, or Firm—Eyre, Mann, Lucas & Just

[57] ABSTRACT

An improvement in flexible couplings is disclosed. The coupling is characterized by having entrainment means separated by sectorial spaces, with baffles disposed in the spaces. The baffles are fastened to an annular disk, which is supported on one of the coupling parts.

6 Claims, 3 Drawing Figures

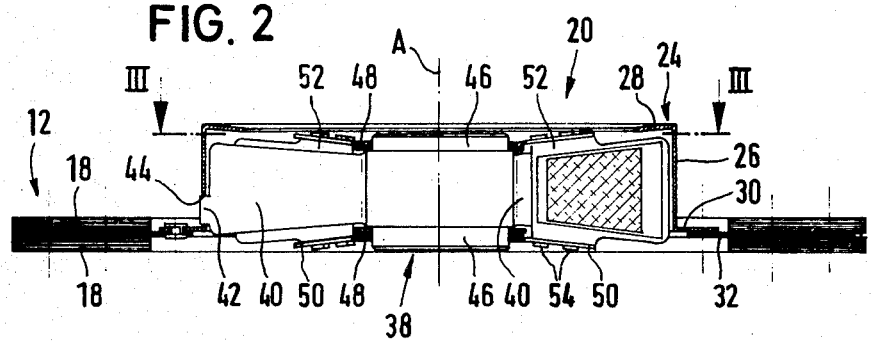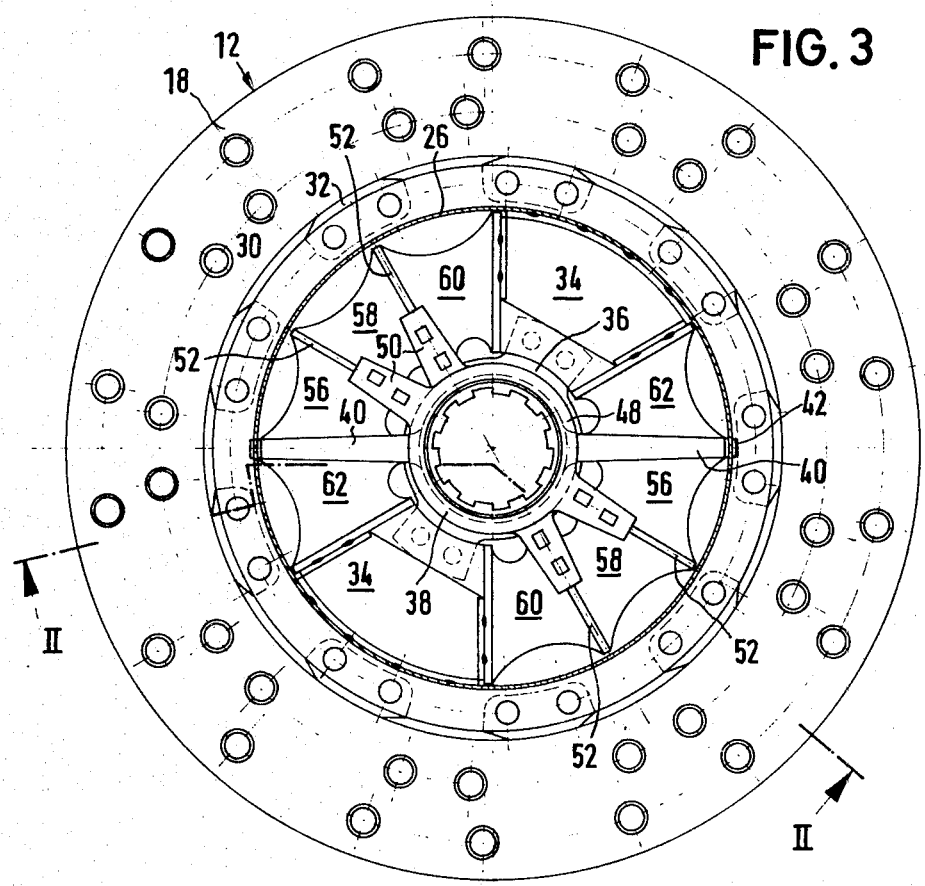

FLEXIBLE COUPLING

The invention relates to a flexible coupling with two rigid coupling parts which are rotatable relative to each other about a central axis, each of said parts having at least two entrainment means; at least two sectorial spaces formed between the entrainment means; at least two elastomeric bodies disposed in each space; and disposed in each space between two elastomeric bodies, there is at least one baffle which is fastened to said elastomeric bodies, which lies at least approximately in a plane containing the central axis, and is supported on one of the rigid coupling parts in such a way that the baffles are able to turn about the central axis.

In a coupling of this type known from British Pat. No. 1,211,689, each of the two rigid coupling parts has three pairs of platelike entrainment means which are staggered in the peripheral direction and each of which is disposed in a plane parallel to the axis of the coupling. Each rigid coupling part further has three bushings which are offset from one another by equal peripheral distances and each of which is disposed between two associated entrainment means and is provided with a hole for a bolt. Each entrainment means of one coupling part bounds, with an entrainment means of the other coupling part, a space having the form of a sector of a circle. Every such space contains an elastic packet formed of a plurality of platelike elastomeric bodies and, disposed between them, intermediate metal plates. In every other packet a central intermediate plate is supported by an elastomeric support cushion disposed radially beyond it on a bracketlike, radially external extension of an adjacent entrainment means. The intermediate plates are movable in the peripheral direction of the coupling, the support cushions being subjected to shearing stresses by the intermediate plates associated with them. The support cushions allow motion in the radial direction toward the exterior only within narrow limits. As a result, the elastic packets disposed between the entrainment means can comprise a larger number of relatively soft elastomeric bodies without there being any danger of said packets buckling radially outward due to compressive and centrifugal forces.

In the prior-art coupling described, the two rigid coupling parts can be twisted relative to each other over a sizable angular range only when the elastic support cushions are of considerable length in the radial direction so that the support cushions during the peripheral movements of the intermediate plates supported by them are not overloaded and do not excessively distort the spring characteristics of the elastic packets. The support cushions therefore require considerable space in the radial direction and consequently result in a substantial increase in the diameter and mass moment of inertia of the prior-art coupling. Moreover, the support cushions will yield in the radial direction when the elastic packets are subjected to radial stresses, and particularly to centrifugal forces. Certain differences in the radial yielding of the support cushions are then unavoidable, as a result of which the elastic packets supported by the individual support cushions are shifted radially outward by differing degrees and the coupling as a whole becomes unbalanced.

While the difficulties described might be overcome in the prior-art coupling by guiding the intermediate plates directly on the bracketlike extensions of the entrainment means and supporting them against centrifugal forces, frictional resistance would then be produced which might severely impede the desired movements of the intermediate plates in the peripheral direction at least at higher rotative speeds.

The invention thus has as its object to improve a flexible coupling of the type described above in such a way that it will allow a twisting of the two coupling parts over a relatively large angular range also at high rotative speeds without objectionable unbalance being produced or excessive frictional resistance having to be overcome.

In a flexible coupling of the type described above, this object is accomplished in accordance with the invention in that two or more baffles disposed in different interspaces are fastened to at least one annular disk which is supported on one of the two rigid coupling parts so as to be rotatable about the central axis.

In this way, provision is made for the respective baffles to move largely frictionless in circular arcs about the axis of the coupling when the two rigid coupling parts are twisted relative to each other. The centrifugal forces acting on the individual baffles cancel each other out at least in part; and when the baffles held together by one or more annular disks are arranged at equal peripheral intervals, as is preferably the case, there will be a complete balancing out of the centrifugal forces so that no appreciable frictional resistance will be produced at the support for the annular disk or for each annular disk, respectively.

The coupling in accordance with the invention is suited for use particularly as a torsional-vibration damper in a clutch of the type usual in motor vehicles. In such a clutch the flexible coupling in accordance with the invention may be disposed between a clutch disk provided with friction pads and an associated hub. Despite its compactness, the flexible coupling in accordance with the invention will then allow considerable twisting of the clutch disk relative to the hub and produce a restoring moment which at first will be small but which will then rapidly increase.

These and other aspects of the present invention may be more fully understood with respect to the drawings wherein:

FIG. 2 shows the coupling illustrated by FIG. 1 in an enlarged axial section along the line II—II in FIG. 3; and FIG. 3 shows a section along the line III—III in FIG. 2.

Figure 1:
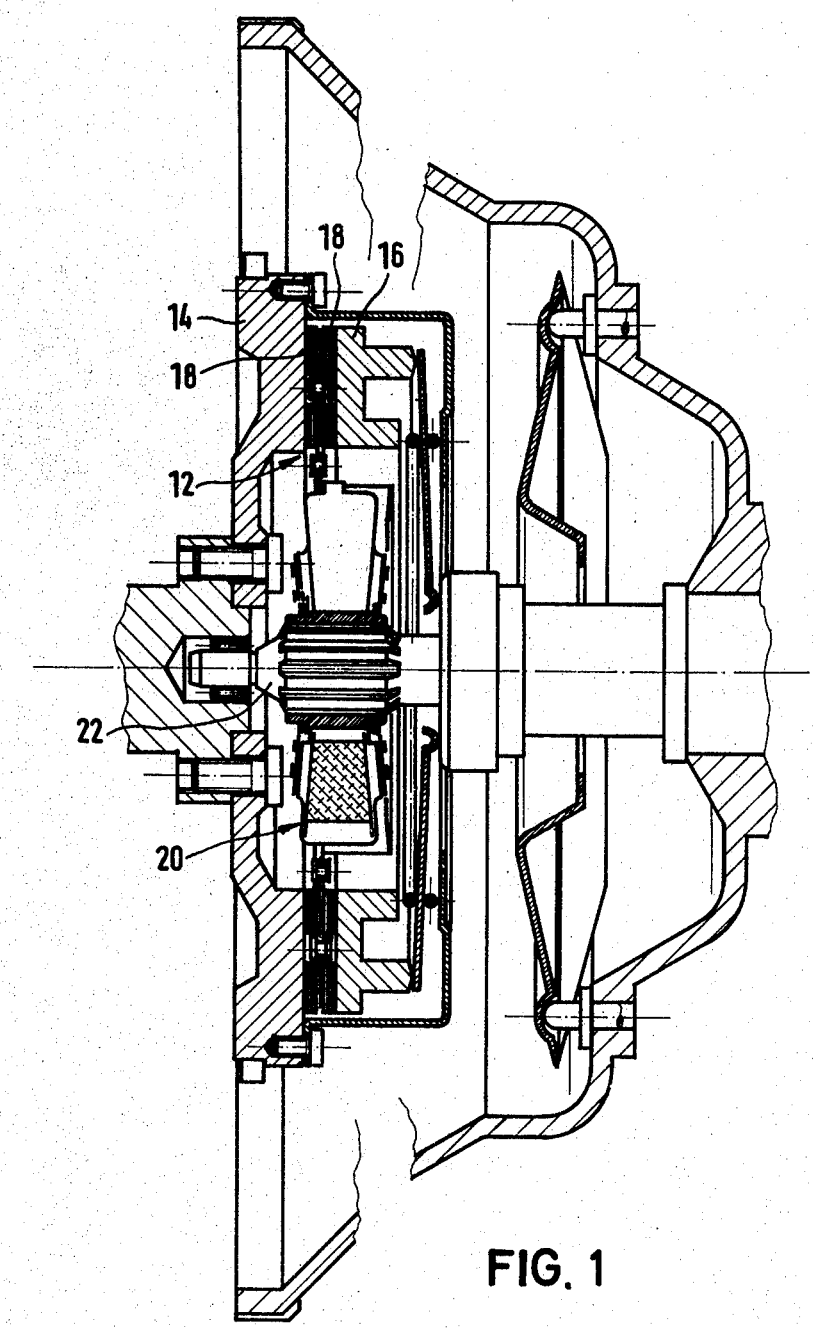
FIG. 1 shows an axial section through a clutch for a motor vehicle in which a flexible coupling in accordance with the invention is incorporated.

The clutch in FIG. 1 comprises a clutch disk 12 which is disposed between a flywheel 14 and a pressure plate 16 and is provided with riveted-on friction pads 18. The clutch disk 12 is connected through a flexible coupling 20 with a shaft 22. With the exception of the flexible coupling 20, which will be described below in detail with reference to FIGS. 2 and 3 said parts and all other parts of the clutch shown in FIG. 1 are of known designs and therefore will not be described in detail.

The flexible coupling 20 shown in FIGS. 2 and 3 has a cup-shaped sheet-metal housing 24 with a cylindrical shell 26, a front plate 28 which in FIG. 2 is at the top, and a flange 30 which projects radially outward and in FIG. 2 is at the bottom. Riveted to the flange 30 are metal spring leaves 32 which are components of the clutch disk 12.

Welded to the inside of the shell 26 are two sheet-metal entrainment means 34 having the shape of a sector of a circle and being diametrically opposed to each other. A ring 36 is fastened to both entrainment means 34 and is centered on a boss 38 without the housing 24 being thereby prevented from rotation relative to the boss 38 about the common central axis A. The boss 38 has internally a multigroove profile which fits onto a complementary multigroove profile of the shaft 22.

In the design in accordance with FIGS. 2 and 3, the boss 38 has two diametrically opposed entrainment means 40. Each of these has at its radially outer end a projection 42 which mates with a slot 44 in the shell 26 of the housing 24 that extends in the peripheral direction. The length of the slots 44 limits an angular range over which the housing 24 is rotatable relative to the boss 38.

On the boss 38 there are further formed two extensions 46 which are centered on the axis A and on each of which two annular disks 48 are rotatably supported. Each of the annular disks 48 has two diametrically opposed lobes 50 which project away from each other. Fastened to the lobes 50 of the two axially outer annular disks 48 are, also diametrically opposed, two plane sheet-metal baffles 52, these being fastened in accordance with FIGS. 2 and 3 by means of projections 54 on the front of the baffles 52 which are lodged in corresponding holes in the lobes 50 and are twisted or pried over on their outside. A further, similar pair of diametrically opposed baffles 52 is fastened in like manner to the lobes 50 of the two axially inner annular disks 48. The two pairs of diametrically opposed baffles 52 are rotatable independently of each other relative to both the housing 24 and the boss 38.

Between every entrainment means 40 associated with the boss 38 and the entrainment means 34 which in accordance with FIG. 3 follows it in the clockwise direction and is associated with the housing 24, a set of three elastomeric bodies 56, 58 and 60 is disposed. The first elastomeric body 56 of each set is vulcanized both to the associated entrainment means 40 and the baffle 52 which follows it in accordance with FIG. 3; the second elastomeric body 58 is vulcanized by its two ends to two baffles 52, and the third elastomeric body 60 is vulcanized to both the second baffle and the entrainment means 34 which in accordance with FIG. 3 follows in the clockwise direction. In the space between each entrainment means 34 associated with the housing 24 and the entrainment means which in accordance with FIG. 3 follows in the clockwise direction and is associated with the boss 38, a fourth elastomeric body 62 is disposed, which, however, is vulcanized to only one of the two entrainment means associated with it and in the unengaged position of the flexible coupling 20 merely abuts on the other entrainment means, either without pressure or with greater or less initial tension.

The elastomeric bodies 56, 58, 60 and 62 may be identical with one another but may also consist of rubber blends of differing hardness so that only the elastomeric bodies which are opposed to each other as pairs have the same spring characteristics. The flexible coupling shown is intended for a principal stress direction in which the elastomeric bodies 56, 58 and 60 are compressed. Of these, the elastomeric bodies 56, for example, may be soft, the elastomeric bodies 58 medium hard, and the elastomeric bodies 60 hard, if correspondingly highly progressive spring characteristics of the entire flexible coupling 20 are desired. In operation in the principal stress direction of the flexible coupling, the elastomeric bodies 62 are not loaded whereas in the so-called push operation, which in the case of a motor vehicle is the state where the engine is being pushed by the vehicle, the elastomeric body 62 is under compression while the elastomeric bodies 56, 58 and 60 are under slight tension, which, however, will not affect their service life.

It will be understood that the claims are intended to cover all changes and modifications of the preferred embodiments of the invention, herein chosen for the purpose of illustration which do not constitute departures from the spirit and scope of the invention.

What is claimed is:

1. A flexible coupling comprising:
   (a) two rigid coupling parts rotatable relative to each other about a central axis;
   (b) at least two entrainment means on each coupling part;
   (c) at least two sets of elastomeric bodies comprising at least first and second sectorial elastomeric bodies, each said set being disposed, respectively, in series between each entrainment means of one coupling part and one adjacent entrainment means of the other coupling part;
   (d) at least two annular discs spaced axially apart and supported on one of said coupling parts so as to be rotatable with respect to both coupling parts;
   (e) at least two baffles, each said baffle positioned between said first and second sectorial elastomeric bodies of each said set;
   (f) said baffles comprising planar baffle plates, the plane thereof containing said central axis, said planar baffle plates being arranged between and secured to said two annular discs; and
   (g) said first and second elastomeric bodies of each set being vulcanized to the planar baffle plate arranged between them.

2. The coupling of claim 1 in which said first and second elastomeric bodies of each group are different in hardness.

3. The coupling of claim 1 further comprising:
   (a) each said set of elastomeric bodies having a third sectorial elastomeric body;
   (b) at least two additional planar baffle plates, each said additional planar baffle plates being arranged between and vulcanized to said second and third elastomeric bodies of each group, respectively;
   (c) an additional pair of annular discs supported on one of said coupling parts so as to be rotatable with respect to both coupling parts; and
   (d) said additional planar baffle plates being arranged between and secured to said additional pair of annular discs.

4. The coupling of claim 3 in which said first, second, and third elastomeric bodies of each group are different in hardness.

5. The coupling of claim 1 or claim 3 wherein each entrainment means of said one coupling part is angularly spaced from two adjacent entrainment means of said other coupling part, defining thereby first and second sectorial spaces; each said first sectorial space containing one of said sets of elastomeric bodies, and each said second sectorial space containing a single elastomeric body vulcanized to only one of the entrainment means defining said second sectorial space.

6. In a flexible coupling of the type having two rigid coupling parts rotatable relative to each other about a central axis, each said coupling part having at least two entrainment means defining at least two sectorial spaces therebetween, and at least two elastomeric bodies disposed in each said sectorial space, the improvement comprising planar baffle plates positioned between said at least two elastomeric bodies, said elastomeric bodies being affixed directly thereto, the planar of said planar baffle plates containing said central axis, and said planar baffle plates being rotatably supported on one of said coupling parts so as to be rotatable with respect to both said coupling parts.

* * * * *